United States Patent
Salla

(10) Patent No.: US 6,287,014 B1
(45) Date of Patent: Sep. 11, 2001

(54) ROLL FOR CONVEYOR

(75) Inventor: Alfredo José Salla, São Paulo (BR)

(73) Assignee: Svedala Industries Canada, Inc., Ontario (CA)

(*) Notice: Subject to any disclaimer, the term of this patent is extended or adjusted under 35 U.S.C. 154(b) by 0 days.

(21) Appl. No.: 09/432,706

(22) Filed: Nov. 2, 1999

(30) Foreign Application Priority Data

Dec. 21, 1998 (BR) .................................................. 9805787

(51) Int. Cl.[7] .................................................. B65G 39/09
(52) U.S. Cl. ............................ 384/546; 193/37; 198/842
(58) Field of Search .................................. 384/480, 546; 193/87; 198/842; 277/420

(56) References Cited

U.S. PATENT DOCUMENTS

| | | | |
|---|---|---|---|
| 3,313,168 | * 4/1967 | Matthews | 198/482 |
| 3,610,387 | * 10/1971 | Vom Stein | 193/37 |
| 4,344,218 | 8/1982 | Hooper et al. | 29/516 |
| 4,955,462 | 9/1990 | Bilodeau et al. | 193/37 |
| 4,972,939 | * 11/1990 | Uttke et al. | 384/480 X |
| 5,261,528 | * 11/1993 | Bouchal | 198/842 |
| 5,944,161 | * 8/1999 | Sealey | 193/37 |

FOREIGN PATENT DOCUMENTS

| | | |
|---|---|---|
| C2-3 238634 | 4/1984 | (DE) . |
| A1-0 112 026 | 6/1984 | (EP) . |
| A-2 047 845 | 12/1980 | (GB) . |
| B-139 635 | 8/1973 | (NO) . |
| B-448 365 | 3/1985 | (SE) . |

OTHER PUBLICATIONS

Enduride Technology, "Enduride conveyor idler rolls . . . ", Camese Compendium, p. 21 No Date.

Enduride Brochure, "Enduride Super Roll", pp. 1–4 No Date.

Enduride Brochure, "Facts About The New Enduride Belt Conveyor Rollers", pp. 1–6 No Date.

* cited by examiner

*Primary Examiner*—Thomas R. Hannon
(74) *Attorney, Agent, or Firm*—Kinney & Lange, P.A.

(57) ABSTRACT

A roll belt conveyor having a shaft that supports, adjacent to both ends, the inner ring of a rolling bearing whose outer ring carries a cylindrical tube encompassing the shaft, there being provided a seal on the outside of each rolling bearing, the roll comprising a ring-shaped bearing housing that presents an external peripheral surface, encasable through elastic deformation, into a superficial internal recess of the cylindrical tube, so as to lock, radially and axially to this the ring-shaped bearing housing, and retaining the adjacent rolling bearing against radial and axial displacements, at least in the inward direction of the roll.

19 Claims, 4 Drawing Sheets

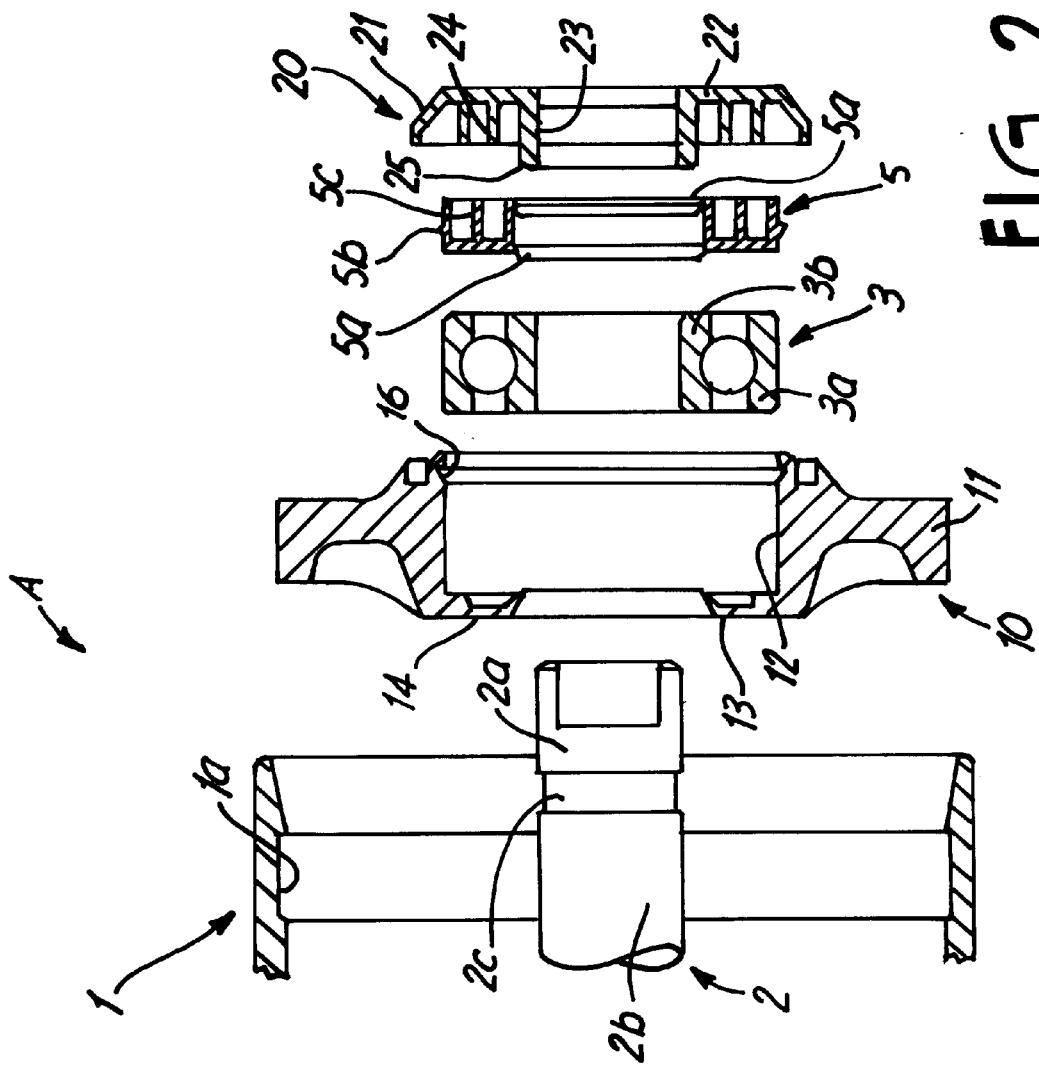

ROLL FOR CONVEYOR

CROSS-REFERENCE TO RELATED APPLICATION(S)

None.

BACKGROUND OF THE INVENTION

In a belt conveyor, the function of the roll is to support the rubber belt and the material being transported, allowing for the rolling movement of the belt. These rolls consist of a cylindrical tube (or shell), and rolling bearings, supported by and fixed to the roll's shaft. The shaft is supported by a frame (or brackets) which in turn is supported by the structure of the conveyor. The rolling bearings of a roll are generally retained to its shaft by means of a spring steel retaining ring, mounted on the shaft and against which a front face of the bearing inner ring rests.

Prior art contemplates a sealing system that aims at offering adequate protection against the entry of dust and moisture while retaining the grease or oil that is necessary for the lubrication of the rolling bearing. The useful life of rolling bearings of a belt conveyor, even if they are correctly dimensioned for the load conditions to which they are subjected, will be severely reduced by contamination if the seal does not offer an adequate protection against the entry of dust and moisture.

In previous constructions, the rolling bearing is generally fixed to the cylindrical tube of the roll by means of a bearing housing (generally a steel sleeve or stamped metal) welded to the end of the cylindrical tube. The bearing housing (or end bell) bends inwardly parallel to the shaft, creating a cavity into which the rolling bearing is press fit. This inward protrusion of the center of the end bell also houses, the various parts that compose the sealing system of the roll, generally of the contact or labyrinth type. The sealing systems are meant to keep dust from entering the roll bearing from outside the roll, and grease from escaping to the inside of the roll.

In these known constructions, the rolling bearing is placed inside the housing, and is separated by a distance D, from the adjacent end of the shaft. The shaft is supported on the structure of the conveyor at the end of the shaft. This support method reduces the load bearing capacity of the roll, by increasing the bending moment of the roll, causing angular deflections in the roll at the bearings. Thus, the useful bearing life is reduced.

Another problem with the known designs of the support roll is the risks posed by the possible fatigue failure of the weldment that affixes the bearing housing to the cylindrical shell. Due to the position of the rolling bearing in relation to the location of the weld, the bearing housing is subjected to an alternating bending moment, thus creating a high risk of failure by fatigue. Specifically, the bearing housing is welded to the adjacent end of the cylindrical shell. The roll bearing is supported by the bearing housing at a position separated from the adjacent end of the roll. Therefore the bearing is separated axially along the roll a distance E. The axial distance E allows for the creation of the bending moment about the roll bearing.

In addition to the inconveniences associated with failed roll assemblies there is the associated damage the failed roll causes to the belt. The damage is in the form of cuts and tears in the belt cover that shortens its life.

In designs where the support is a ring-shaped housing, (generally made of steel), securing parts of the roll (such as by welding) make the roll production work time consuming. On the other hand, attempts to simplify the fixation between components were both problematic and economically unfeasible due to the reduced tolerances required when producing the parts of the assembly. This was particularly the case when applying rigid parts for the ring-shaped housing and for the end element in order to axially lock the cylindrical tube to the shaft.

BRIEF SUMMARY OF THE INVENTION

The present invention refers to a construction arrangement for the housing and sealing of the end bearings of a support roll of a belt conveyer.

More particularly, the present invention provides a belt conveyor roll of reduced cost which eliminates the use of points of welds and spring steel retaining rings to affix the bearing housing to the cylindrical tube and the bearing to the roll shaft respectively. The invention permits the use of components with ample dimensional tolerances.

Additionally, the present invention provides a roll, which allows the sealing of the region where the rolling bearing is mounted to the roll shaft, with a system of small diameter contact lips that present a small radius. Sealing labyrinths are used to avoid the escape of grease or any other lubricant from the shaft region where the rolling bearing is, and also prohibit the entry of dust or moisture to the region where the rolling bearings are mounted.

The inventive belt conveyor roll has a shaft supporting the inner ring of a rolling bearing adjacent to each end of the shaft. The inner ring locks against axial displacements in the direction of the shaft. The outer ring of the rolling bearing supports a cylindrical shell mounted so as to encompass the shaft. The roll also comprises a ring-shaped bearing housing that presents a peripheral external surface which is fitted, through elastic deformation, into a superficial internal undercut in the cylindrical shell, so that the shell locks radially and axially to the ring-shaped housing. The bearing housing also has an internal peripheral surface against which the outer ring of the adjacent rolling bearing is seated and retained against radial and axial displacements.

BRIEF DESCRIPTION OF THE DRAWINGS

FIG. 2 shows a full cross-sectional and exploded view, of the end of the roll illustrated in FIG. 1.

DETAILED DESCRIPTION

Figure 1:
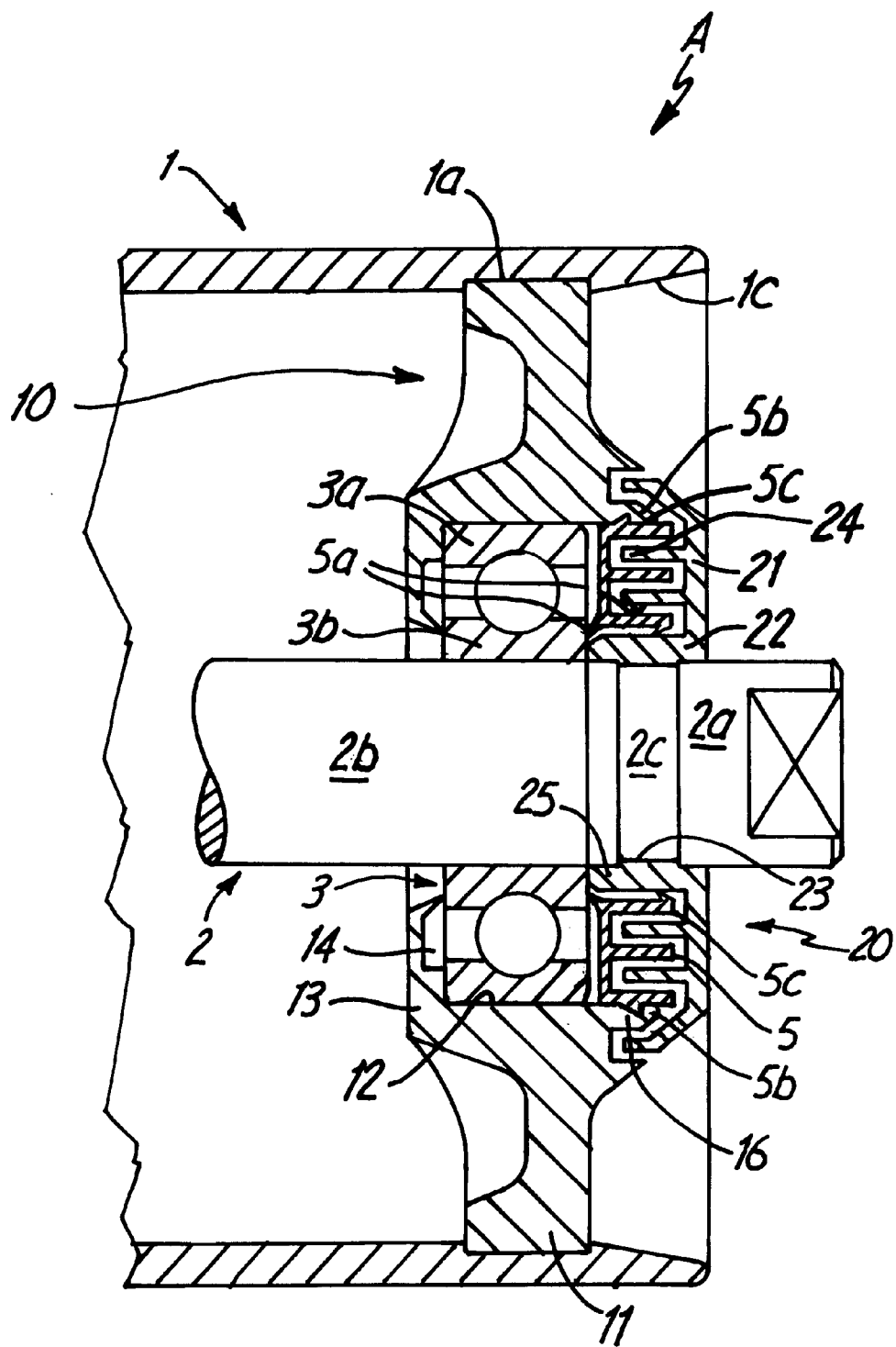
FIG. 1 shows a full cross-sectional view of one of the ends of a roll constructed in accordance with the present invention.
Figure 2A:
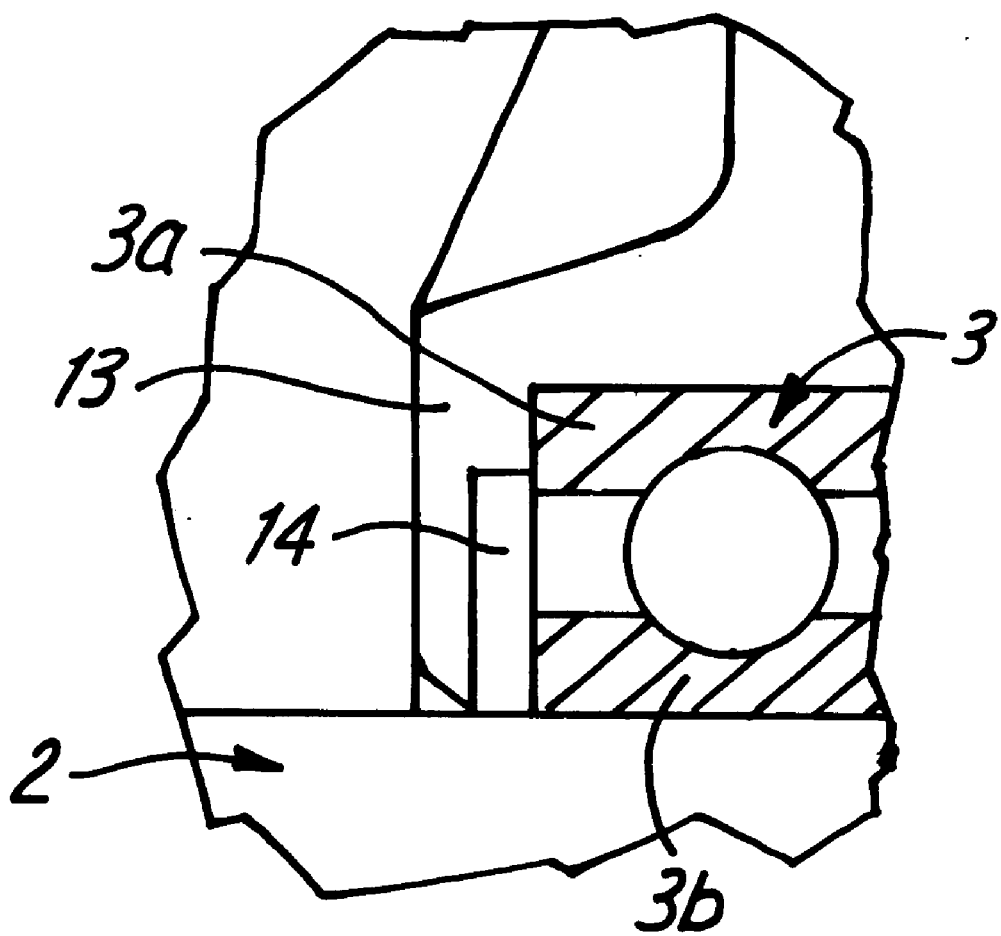
FIG. 2A shows a partial cross-sectional view of an alternate embodiment of the circumferential recess.

In accordance with the figures shown, a belt conveyor roll A is shown generally in FIGS. 1 and 2. Roll A comprises a cylindrical tube (or shell) 1, upon which a conveyor belt (not shown) rides, and which encompasses a shaft 2, whose two ends 2a project beyond a plane defined by the adjacent peripheral edge of the cylindrical tube 1, and which may be held in respective supports on the conveyor (not illustrated). Adjacent to each of the shaft 2 ends 2a, a rolling bearing 3 whose outer ring 3a carries the cylindrical tube 1 of the roll, by means of a respective ring-shaped bearing housing 10, elastically deformable in order to be fitted and internally located in the cylindrical tube 1.

In these constructions, anteriorly to each rolling bearing 3 is provided a seal 5, mounted on the shaft 2, between the adjacent end 2a of the shaft 2 and the respective rolling bearing 3.

The ring-shaped bearing housing 10 has an external peripheral surface 11 fixed to the cylindrical tube 1, (for example by mechanical interference) and an internal peripheral surface 12 mounted on the rolling bearing 3. A seal 5 is fixed around an adjacent portion of the assembly 2b of the shaft 2, internal in relation to the cylindrical tube 1, and externally in relation to the rolling bearing 3. The seal 5 can have a front face forming axial labyrinths, as being exemplified in FIG's 1 and 3. In order to minimize the entry of contaminants and moisture into the region of the rolling bearing around the shaft 2, the seal 5 is fixed to the adjacent ring-shaped bearing housing 10, slidingly seated on at least one of the parts of the front face of an inner ring 3b of the adjacent rolling bearing 3 (alternatively, the seal 5 may be seated on an end cover 20, to be described later). The illustrated seal 5 has on its internal peripheral surface at least two internal circumferential elastically deformable lips 5a, one of which deforms when in contact with the inner ring 3b of the adjacent rolling bearing 3, and the other, when in contact with the cover 20. In the preferred embodiment, the seal 5 presents two internal circumferential projections 5a, parallel and aligned between themselves in such a way that one circumferential and frontal internal projection 5a, minimizes the entry of dust and moisture into the interior of the ring-shaped bearing housing 10 in the region of the shaft 2, while the other circumferential and rear internal projection 5a, minimizes the outflow of the lubricant, normally grease, from the region of the rolling bearing 3.

In accordance with the present invention, the external peripheral surface 11 of the ring-shaped bearing housing 10, is fitted by means of elastic deformation, and with the help of an outer conical portion 1c of the cylindrical tube 1, into an internal groove 1a in the cylindrical tube 1, in such a way that it will be locked both radially and axially to the cylindrical tube 10. The preferred embodiment of the bearing housing 10 is manufactured of plastic material to provide the elastic deformation required. A person skilled in the art, however, would realize that other elastic materials may be used to manufacture the bearing housing 10 without departing from the spirit and scope of the invention.

In this embodiment, the ring-shaped bearing housing 10 has its outer rim shaped so that it can be encased in a region of the internal wall of the cylindrical tube 1, which is provided with a corresponding circumferential undercut that defines the superficial internal groove 1a. The ring-shaped bearing housing 10 of the present invention is made of an elastically deformable material, such as plastic, so that its introduction into the cylindrical tube 1 is permitted, until its external peripheral surface 11 clicks into the internal groove 1a of the cylindrical tube 1, thus ensuring the axial and circumferential locking of the ring-shaped bearing housing 10 in the interior of the cylindrical tube 1.

The outer ring 3a of the adjacent rolling bearing 3, is seated and retained against a peripheral inner surface 12 of the ring-shaped bearing housing 10 in order to avoid radial and axial displacements. The inner ring 3b of the rolling bearing 3 is seated around the adjacent portion of the assembly 2b of the shaft 2. In the preferred embodiment, the internal groove 1a, the bearing housing 10 and the roll bearing 3 are aligned along a radial plane perpendicular to the shaft 2. Aligning the components in this manner eliminates much of the bending moment caused in prior art designs where the bearing housing 10 is welded to the adjacent end of the cylindrical tube 1.

The internal peripheral surface 12 of the ring-shaped bearing housing 10 incorporates, at its posterior edge, an annular rim 13 that projects radially inwards and whose middle front face is provided with a circumferential recess 14 positioned in such a way as to define, with the posterior surface of the adjacent rolling bearing 3, a lodging for the retention of lubricant that opens onto the region of the rolling elements of the aforementioned rolling bearing 3. In the illustrated construction, the annular rim 13 stays radially apart from the shaft 2, but is seated against the posterior face of the outer ring 3a and inner ring 3b of the rolling bearing 3, in such a way that it confines the lubricant to the inside of a circumferential recess (or cavity) 14, hindering its escape from the rolling bearing 3. In an alternate embodiment shown in FIG. 2A, the annular rim 13 extends radially inwardly so as to seat against the shaft 2 where the inner ring 3b engages the shaft 2.

The annular rim 13 of the ring-shaped bearing housing 10 also has the function of operating as an axial internal stop against which the posterior faces of the outer ring 3a and the inner ring 3b of the rolling bearing 3 are seated. When the shaft 2 is mounted, axial movement of the rolling bearing 3 along the said shaft 2 in the direction of the inner part of the cylindrical tube 1 is thereby avoided.

Figure 3:
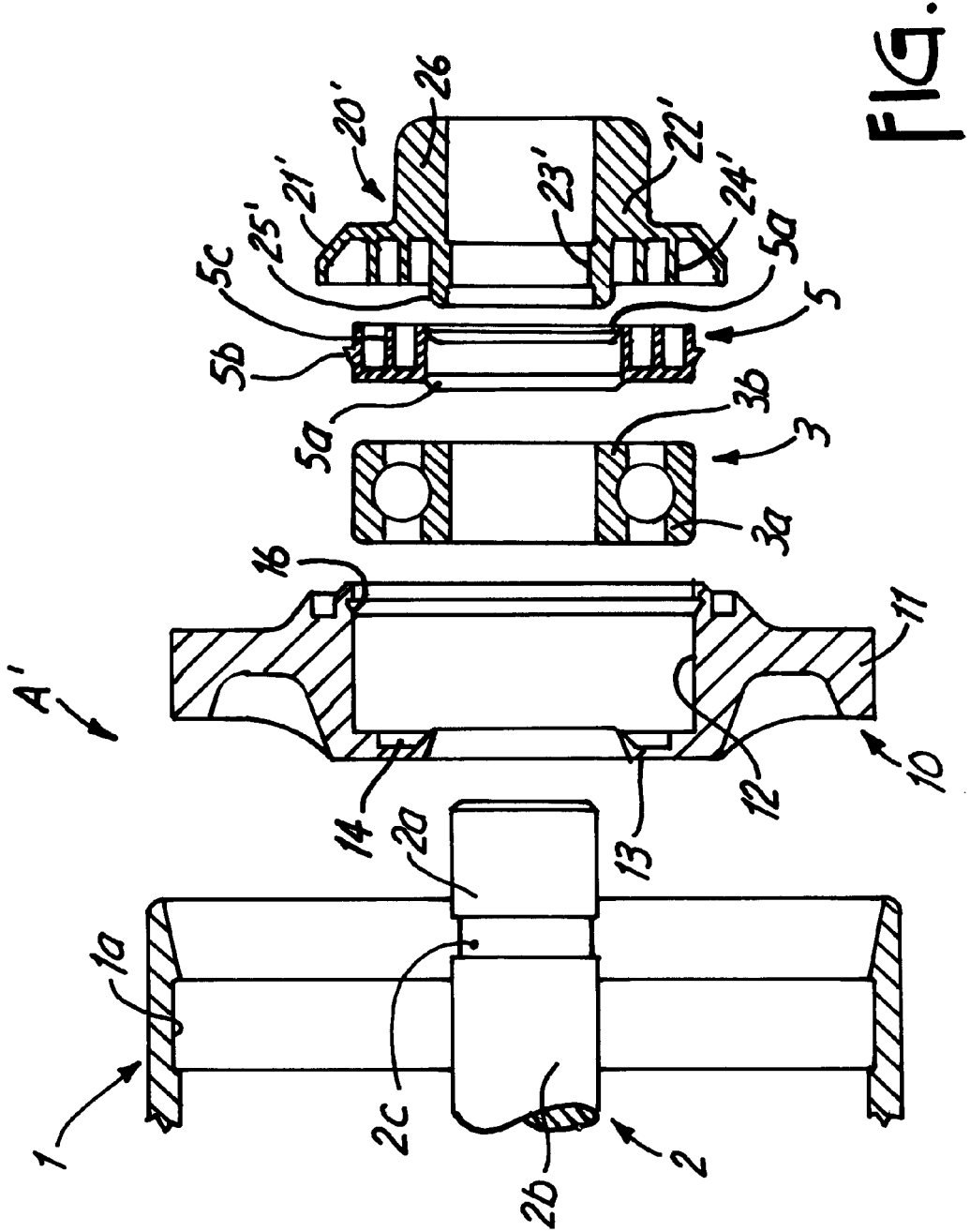
FIG. 3 shows a full cross-sectional and exploded view, of the end of the roll illustrated in FIG. 1 presenting another embodiment of the end cover.

A person skilled in the art would realize that alternate embodiments of the seal 5 may be used which are adequate for this type of application, provided they ensure the protective sealing of the rolling bearing. In accordance with what is illustrated in FIGS. 1–3, the seal 5 assumes the form of an annular body with its outer peripheral surface provided axially with a circumferential rib 5b that is encasable in a circumferential groove 16 in the internal peripheral surface 12 of the ring-shaped bearing housing 10, thus allowing the locking of the seal 5 against axial and circumferential displacements in relation to the ring-shaped bearing housing 10. The seal 5 presents a posterior portion that may contact the anterior face of the outer ring 3a of the rolling bearing 3, thus protecting the rolling bearing 3 against dust and moisture. The seal 5 together with the end cover 20 (described later) helps to retain the rolling bearing 3 against axial displacement outwards (away from the interior of the shaft 2). The front face of the seal 5 is preferably provided with alternating axial circumferential projections 5c which permit the definition of a labyrinth when they are coupled to corresponding parts of an adjacent complementing part and which, in the preferred embodiment, takes the form of the end cover 20 fixed to each end 2a of the shaft 2.

In accordance with the embodiment illustrated in FIGS. 1 and 2, each end cover 20 comprises an annular flange 21 incorporated to a cylindrical hub 22 which is mounted on the respective ends 2a of the shaft 2, and retained there mechanically by means of at least one internal circumferential protuberance 23, for example, a continuous circumferential projection in the form of a retaining ring, in a respective superficial external recess 2c, for example, a circumferential groove, provided in the shaft 2. Thus, the end cover 20 is locked radially and axially to the shaft 2. The preferred embodiment of the invention utilizes an end cover 20 comprised of plastic to provide elastic deformation, allowing the end cover to be locked into the external recess 2c of the shaft. A person skilled in the art, however, would realize that other elastic materials may be used for the end cover 20 without departing from the spirit and scope of the invention.

In accordance with FIGS. 1–3, the posterior face of the annular flange 21 embodies axial circumferential projections 24 which fit into the anterior axial circumferential projections 5c of the seal 5, thus forming a labyrinth which increases the protection provided to the rolling bearing 3 by the seal 5. The axial retention of the rolling bearing 3 against displacement in the outward direction of the adjacent end 2a of the shaft 2, is obtained by seating a portion of a posterior wall 25, on the cylindrical hub 22 of the cover 20, against the anterior face of the inner ring 3b of the adjacent rolling bearing 3.

In an alternate embodiment of the inventive conveyor roll A' illustrated in FIG. 3, the cylindrical hub 22' embodies an anterior tubular extension 26 enveloping the adjacent end 2a of the shaft 2, and around which is secured the respective element of fixation (not shown) to the structure of the belt conveyor. In the embodiments illustrated in of FIGS. 1 and 2, the cover does not present the anterior axial tubular projection 26 of the hub 22, leaving the end 2a of the shaft 2 uncovered when it is to be fixed to the structure.

In all the embodiments of the inventive conveyor roll, the installation of the bearing housing 10, seal 5 and end cover 20 are easily and quickly fitted into position. The use of the internal groove la in combination with the elastic housing 10 and the conical portion Ic allows the bearing housing 10 to be easily snapped into place. This differs from prior art, where welding or large amounts of machining time was required to secure the bearing housing 10 to the roll embodiments. Additionally, the ribs 5b, protuberance 23, and projections 5a allow the seal 5 and end cover 20 to be slideably installed over the shaft, and locked into place.

It should be additionally noted that although the inventive roll bearing housing and sealing apparatus concept has been described with respect to a belt conveyor system, a person skilled in the art would realize that it can be used with other roll conveyor systems. For example, the inventive concept can be used equally well on rolls used with unit conveyors.

Although the present invention has been described with reference to preferred embodiments, workers skilled in the art will recognize that changes may be made in form and detail without departing from the spirit and scope of the invention.

What is claimed is:

1. A roll for a conveyor comprising a shaft supporting, adjacent to each end and locking against axial displacements in the direction of the latter, an internal ring of a rolling bearing, whose outer ring carries a cylindrical tube disposed encompassing the shaft, characterized by: a ring-shaped bearing housing that presents a peripheral external surface that is encasable, by means of elastic deformation, into a single superficial internal recess of the cylindrical tube, thus locking radially and axially to the cylindrical tube the ring-shaped bearing housing and an internal peripheral surface against which is seated and retained, against radial and axial displacements, at least in inward direction of the roll, the outer ring, of the adjacent rolling bearing.

2. The roll of claim 1, wherein the internal superficial recess is a circumferential groove.

3. The roll of claim 2, wherein the ring-shaped bearing housing is provided with a circumferential recess defining, with a posterior face of the adjacent rolling bearing, a lodging for retaining lubricant.

4. The roll of claim 3, wherein the circumferential recess is provided in the middle of an anterior face of an incorporated annular rim and projecting radially into an inner part of the ring-shaped bearing housing.

5. The roll of claim 4, wherein the annular rim is radially distant from the shaft, seated against posterior faces of the outer and inner rings of the adjacent rolling bearing.

6. The roll of claim 1, and further comprising a seal provided externally to each rolling bearing, fixed to the ring-shaped bearing housing and slidingly seated on at least one of the parts defined by an anterior face of the inner ring of the rolling bearing and an end cover.

7. The roll of claim 6, wherein the ring-shaped bearing housing and the end cover are made of plastic material.

8. A roll for a conveyor comprising a shaft supporting, adjacent to each end and locking against axial displacements in the direction of the latter, an internal ring of a rolling bearing whose outer ring carries a cylindrical tube disposed encompassing the shaft, characterized by: a ring-shaped bearing housing that presents a peripheral external surface that is encasable, by means of elastic deformation, into a superficial internal recess of the cylindrical tube, thus locking radially and axially to the cylindrical tube the ring-shaped bearing housing and an internal peripheral surface against which is seated and retained, against radial and axial displacements, at least in inward direction of the roll, the outer ring, of the adjacent rolling bearing, and further comprising an end cover incorporating at least one circumferential internal protuberance, encasable by means of elastic deformation, into one superficial external recess of the shaft, thus locking radially and axially to the end cover, the cover carrying one portion of a posterior wall seated against an anterior face of the inner ring of the adjacent rolling bearing, locking the bearing against axial displacements towards the adjacent end of the shaft.

9. A roll for a conveyor comprising a shaft supporting, adjacent to each end and locking against axial displacements in the direction of the latter, an internal ring of a rolling bearing whose outer ring carries a cylindrical tube disposed encompassing the shaft, characterized by: a ring-shaped bearing housing that presents a peripheral external surface that is encasable, by means of elastic deformation, into a superficial internal recess of the cylindrical tube, thus locking radially and axially to the cylindrical tube the ring-shaped bearing, housing and an internal peripheral surface against which is seated and retained, against radial and axial displacements, at least in inward direction of the roll, the outer ring, of the adjacent rolling bearing, and further comprising a seal provided externally to each rolling bearing, fixed to the ring-shaped bearing housing and slidingly seated on at least one of the parts defined by an anterior face of the inner ring of the rolling bearing and an end cover wherein the ring-shaped bearing housing and the end cover are made of plastic material and wherein the end cover comprises a cylindrical hub that includes an internal circumferential protuberance and an annular flange.

10. The roll of claim 9, wherein the internal circumferential protuberance is in the form of a continuous circumferential projection.

11. The roll of claim 9, wherein an external superficial recess presents the form of a retaining groove disposed about the shaft so as to receive the internal circumferential protuberance.

12. The roll of claim 9, wherein the cylindrical hub carries a portion of a posterior wall of the end cover so as to prevent axial and radial movement of the rolling bearing.

13. The roll of claim 12, wherein the seal presents two internal circumferential projections, parallel and aligned between themselves, one of which seats on the portion of the posterior wall of the end cover, and the other on the anterior face of the inner ring of the adjacent rolling bearing.

14. The roll of claim 9, wherein the end cover comprises an anterior tubular axial extension incorporated to the cylindrical hub, involving the adjacent end of the shaft.

15. The roll of claim 9, wherein the seal is an annular body that incorporates, on its peripheral internal surface, at least two internal circumferential lips, elastically deformable through contact with one of the parts of the anterior face of the inner ring of the adjacent rolling bearing and with the end cover, and on one peripheral external surface, one circumferential lip encasable in a circumferential recess of the internal peripheral surface of the ring-shaped bearing housing, thus allowing the locking of the seal against axial and circumferential displacements in relation to the ring-shaped bearing housing.

16. The roll of claim 9, wherein the seal is of the labyrinth type having one anterior face furnished with alternating circumferential projections.

17. The roll of claim 16, wherein the posterior face of the annular flange of the extreme end cover embodies axial circumferential projections, encasable between the circumferential axial projections of the seal.

18. A roll for a conveyor comprising:
   a shaft having two ends;
   a bearing having an internal ring and an outer ring, the internal ring supported and locked against axial displacement by the shaft;
   a cylindrical tube disposed encompassing the shaft and supported by the outer ring of the bearing;
   a ring-shaped bearing housing disposed longitudinally inward from an adjacent peripheral edge of the cylindrical tube, and presenting a peripheral external surface and an internal peripheral surface, wherein substantially all of the peripheral external surface is encasable into a superficial internal recess of the cylindrical tube, locking the ring-shaped bearing housing radially and axially to the cylindrical tube, and wherein the internal peripheral surface is seated and retained against the outer ring of the adjacent bearing so as to lock radially and axially the bearing in relation to the roll.

19. The roll of claim 18 and further comprising:
   an outer conical portion of the cylindrical tube disposed between the adjacent peripheral edge of the cylindrical tube and the superficial internal recess, wherein the outer conical portion guides the ring-shaped bearing housing into the superficial internal recess during assembly of the roll.

\* \* \* \* \*